(12) United States Patent
Wakamatsu

(10) Patent No.: US 11,656,823 B2
(45) Date of Patent: May 23, 2023

(54) INFORMATION PROCESSING APPARATUS, PRINTING APPARATUS, AND INFORMATION PROCESSING SYSTEM

(71) Applicant: FUJIFILM Business Innovation Corp., Tokyo (JP)

(72) Inventor: Jun Wakamatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/461,953

(22) Filed: Aug. 30, 2021

(65) Prior Publication Data
US 2022/0229616 A1 Jul. 21, 2022

(30) Foreign Application Priority Data
Jan. 19, 2021 (JP) .............................. JP2021-006599

(51) Int. Cl.
*G06F 3/12* (2006.01)
*G06K 15/02* (2006.01)

(52) U.S. Cl.
CPC .......... *G06F 3/1268* (2013.01); *G06F 3/1204* (2013.01); *G06F 3/1287* (2013.01); *G06K 15/1836* (2013.01)

(58) Field of Classification Search
None
See application file for complete search history.

(56) References Cited

U.S. PATENT DOCUMENTS

| 2011/0170123 A1* | 7/2011 | Ito ...................... H04N 1/00885 |
| | | 358/1.9 |
| 2020/0133591 A1* | 4/2020 | Kaneda ................... G06F 3/122 |
| 2020/0167107 A1* | 5/2020 | Schiestl ............... G06F 3/1204 |

FOREIGN PATENT DOCUMENTS

| JP | 2013225256 | 10/2013 |
| JP | 2016040740 | 3/2016 |
| JP | 2016162244 | 9/2016 |

* cited by examiner

*Primary Examiner* — Frantz Bataille
(74) *Attorney, Agent, or Firm* — JCIPRNET

(57) ABSTRACT

An information processing apparatus that manages print processes of plural printing apparatuses, the information processing apparatus includes a processor configured to acquire execution information indicating an execution status of each printing apparatus from the plural printing apparatuses, in a case in which a predetermined condition regarding processing of converting print data into a raster image is satisfied in one printing apparatus, extract another printing apparatus capable of executing the processing of converting the print data into the raster image from among other printing apparatuses other than the one printing apparatus by using the execution information, cause the other printing apparatus, that is extracted, to execute the processing of converting the print data of a print job scheduled to be printed in the one printing apparatus into the raster image, and perform control to transmit the raster image created by the other printing apparatus to the one printing apparatus.

15 Claims, 9 Drawing Sheets

INFORMATION PROCESSING APPARATUS, PRINTING APPARATUS, AND INFORMATION PROCESSING SYSTEM

CROSS-REFERENCE TO RELATED APPLICATIONS

This application is based on and claims priority under 35 USC 119 from Japanese Patent Application No. 2021-006599 filed Jan. 19, 2021.

BACKGROUND

(i) Technical Field

The present invention relates to an information processing apparatus, a printing apparatus, and an information processing system.

(ii) Related Art

JP2013-225256A discloses a print job transmission apparatus that executes rasterization processing on print data received from a client terminal. The technology is disclosed in which first transmission time required for transmission of a print job after the rasterization processing to an image forming apparatus is predicted, first time is calculated by adding the first transmission time and first processing time required for the rasterization processing, second transmission time required for transmission of a print job before the rasterization processing to the image forming apparatus is predicted, second processing time required for executing the rasterization processing on the print job in the image forming apparatus is predicted, second time is calculated by adding the second transmission time and the second processing time, in comparison between the first time and the second time, the print job after the rasterization processing is transmitted to the image forming apparatus in a case in which the first time is short, and the print job before the rasterization processing is transmitted in a case in which the second time is short.

JP2016-040740A discloses an information processing apparatus that can perform communication with a plurality of drawing data creation units that create drawing data used for image formation in a printing apparatus. The technology is disclosed which an acquisition unit that acquires print setting information and print data used for creation of the drawing data by the drawing data creation unit, a conversion unit that converts the setting information into apparatus setting information in a format handled by the information processing apparatus, a creation unit control unit that analyzes information included in the apparatus setting information to select the drawing data creation unit, and outputs the apparatus setting information in a form in accordance with the selected drawing data creation unit and the print data to the drawing data creation unit are provided.

JP2016-162244A discloses the technology in which a hybrid work flow (HWF) system collectively manages a plurality of different types of image forming apparatuses in a management apparatus, the system processing images, in which in a case in which newly received job data is a reverse-order job, raster image processor (RIP) processing of the newly received job data is consigned to an HWF server to efficiently perform control of consigning image processing to be executed in the image forming apparatus to a management apparatus side.

SUMMARY

There is a printing system in which a print preprocessing process, a print process, and a postprocessing process of a plurality of printing apparatuses are collectively managed by a process management apparatus. In a case of performing print, processing of converting print data into a raster image is executed, but depending on the print data, the processing of converting the print data into the raster image takes time. The output speed of the print may be decreased for waiting for the processing of converting to the raster image.

There is a case in which a printed material output by a certain printing apparatus is output by dividing into a plurality of printing apparatuses or a case in which the respective print jobs are output by different printing apparatus in order to complete the print process within scheduled time. However, in a case in which the printed material is output by a printing apparatus other than the initially scheduled printing apparatus, a work of rearranging the output printed materials into initial order and print bundle may occur.

Aspects of non-limiting embodiments of the present disclosure relate to an information processing apparatus, a printing apparatus, and an information processing system that reduce time required for a print process while suppressing an output of a printed material of a print job assigned to the printing apparatus by another printing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus that manages print processes of a plurality of printing apparatuses, the information processing apparatus including a processor configured to acquire execution information indicating an execution status of each printing apparatus from the plurality of printing apparatuses, in a case in which a predetermined condition regarding processing of converting print data into a raster image is satisfied in one printing apparatus, extract another printing apparatus capable of executing the processing of converting the print data into the raster image from among other printing apparatuses other than the one printing apparatus by using the execution information, cause the other printing apparatus, that is extracted, to execute the processing of converting the print data of a print job scheduled to be printed in the one printing apparatus into the raster image, and perform control to transmit the raster image created by the other printing apparatus to the one printing apparatus.

BRIEF DESCRIPTION OF THE DRAWINGS

Exemplary embodiment(s) of the present invention will be described in detail based on the following figures, wherein.

DETAILED DESCRIPTION

Description of Overall Configuration of Printing System

Hereinafter, an exemplary embodiment of the present invention will be described in detail with reference to drawings.

Figure 1:
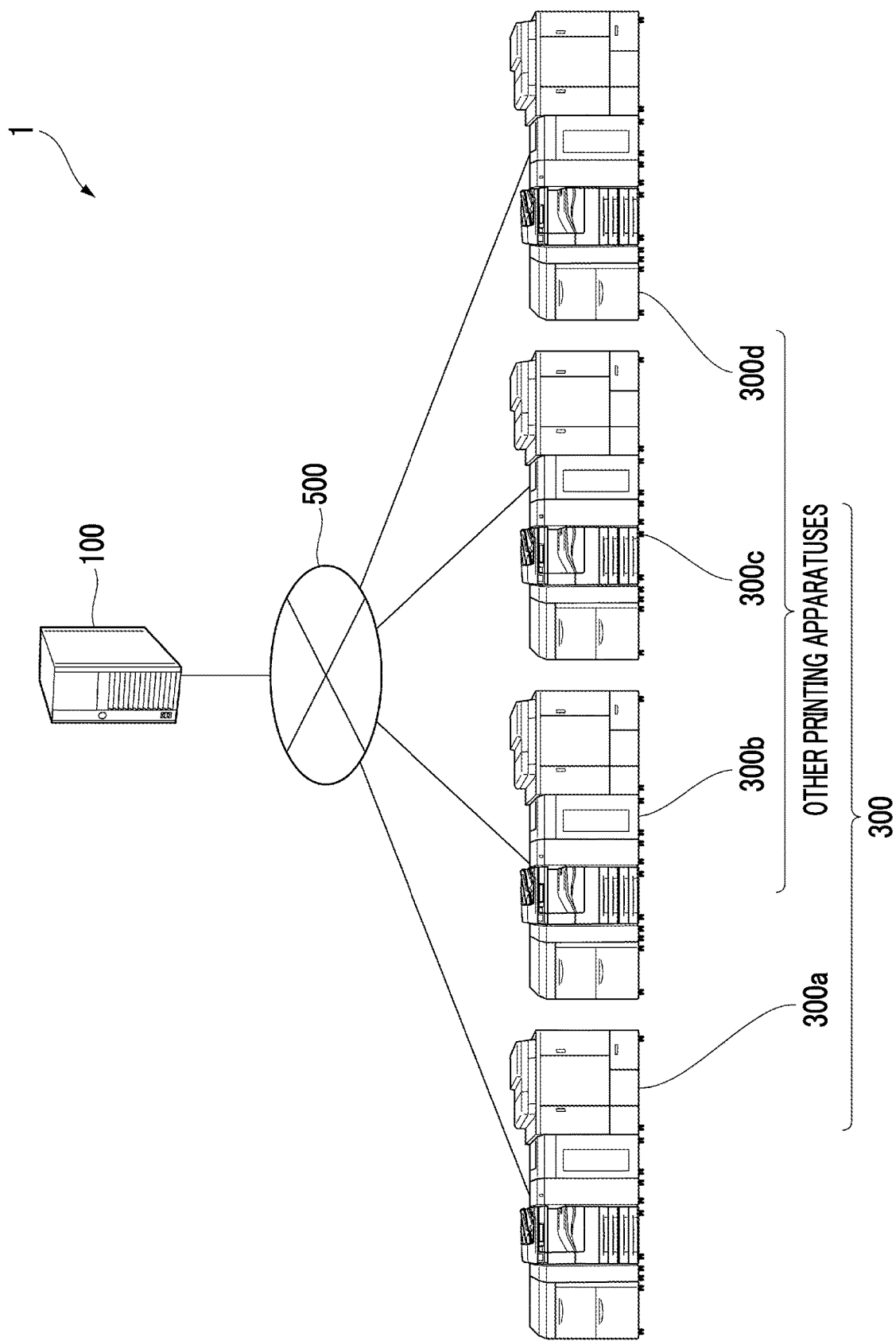
FIG. 1 shows an overall configuration example of a printing system to which the present exemplary embodiment is applied.

FIG. 1 shows an overall configuration example of a printing system 1 to which the present exemplary embodiment is applied.

A printing system 1 shown in FIG. 1 includes a process management apparatus 100 that manages a print job, and a plurality of printing apparatuses 300 (300a to 300d) that perform print based on the print job. The process management apparatus 100 manages the plurality of printing apparatuses 300. The process management apparatus 100 and the printing apparatuses 300 are connected to a network 500.

Note that among the plurality of printing apparatuses 300, with respect to a first printing apparatus 300a, the expression of other printing apparatuses 300b to 300d is adopted, and the expression of a second printing apparatus 300b among the other printing apparatuses 300b to 300d is adopted. Where, in a case in which distinguishing between the printing apparatuses is not necessary in the description of the present exemplary embodiment, the printing apparatuses may be referred to as the "printing apparatus 300". Further, FIG. 1 shows four printing apparatuses 300, but the number of printing apparatuses 300 is not limited to four.

The network 500 is a communication unit used for information communication between the process management apparatus 100 and the printing apparatus 300, and is, for example, a local area network (LAN). Further, the present invention is not limited thereto, and for example, an external network may be used, and the communication may be wired or wireless.

The process management apparatus 100 is a computer apparatus that manages the plurality of printing apparatuses 300 and a plurality of print jobs. The process management apparatus 100 is an example of an information processing apparatus, and examples thereof include a personal computer (PC) or a server apparatus. The process management apparatus 100 divides the job into a front page, a text, a cover, and the like in accordance with the printing apparatus in a print process, schedules the print in accordance with a delivery date, and provides an instruction for print execution.

The printing apparatus 300 is an apparatus that forms an image on a recording medium, such as paper, based on the print job and outputs the image as a print medium. In the present exemplary embodiment, a mechanism for forming the image is not particularly limited, and various existing methods, such as an electrophotographic method by using toner as a coloring material or an ink jet method by using ink as a coloring material are used. Further, as the printing apparatus 300, an apparatus including only a print function may be used, or an integrated apparatus including a post-processing apparatus in addition to the printing apparatus 300 may be used. The postprocessing apparatus is an apparatus that processes the print medium on which the image is formed, and is, for example, an apparatus that executes punch processing of punching holes in the print medium, staple processing of arranging the print media, or folding processing of folding the print medium.

Here, the print job is a unit of processing, which is created for performing the print by the printing apparatus 300. Data of the print job includes print data and various pieces of control information other than the print data. The print data is data representing an image for forming the image on a recording material. Examples of various pieces of the control information other than the print data include data of a print job name, data of a paper type, such as a paper name and a model number for specifying a paper size and a paper quality, or information data of completion desired time, which is a deadline by which the print job should be completed. Further, in the present exemplary embodiment, there is output designation information which is information indicating a stage in which the print job should be processed (described below).

The print data acquired by the printing apparatus 300 is generally described in page description language (PDL). Here, the page description language expresses the image as a collection of drawing commands for each object that constitutes the image. The print data described in the page description language is converted into a raster image by the printing apparatus 300, and the print is executed. Here, the raster image expresses the image as a collection of pixels respectively having a predetermined number of color value sets. Generally, a processing apparatus that converts the page description language into the raster image may be referred to as a raster image processor (RIP), and conversion of the page description language into the raster image may be referred to as RIP processing. Hereinafter, processing of converting the print data described in the page description language into the raster image may be referred to as "RIP processing". The print data of the print job includes data described in the page description language and data of the raster image.

Depending on the content of the print data, the RIP processing of converting the print data described in the page description language into the raster image may take time. In this case, the print data which should be subjected to the RIP processing may be accumulated in the printing apparatus 300, and the print job may not be completed within scheduled time.

In the present exemplary embodiment, in a case in which an amount of the print data which should be subjected to the RIP processing in the first printing apparatus 300a exceeds a predetermined amount, the process management apparatus 100 consigns the RIP processing to the second printing apparatus 300b among the other printing apparatuses 300b to 300d which can execute the RIP processing. Then, the raster image, which is subjected to the RIP processing by the second printing apparatus 300b, and various pieces of the control information are transmitted to the first printing apparatus 300a via the process management apparatus 100 or directly from the second printing apparatus 300b. The first printing apparatus 300a that acquires the raster image performs the print without executing the RIP processing on the print job.

Hardware Configuration of Process Management Apparatus

Figure 2:
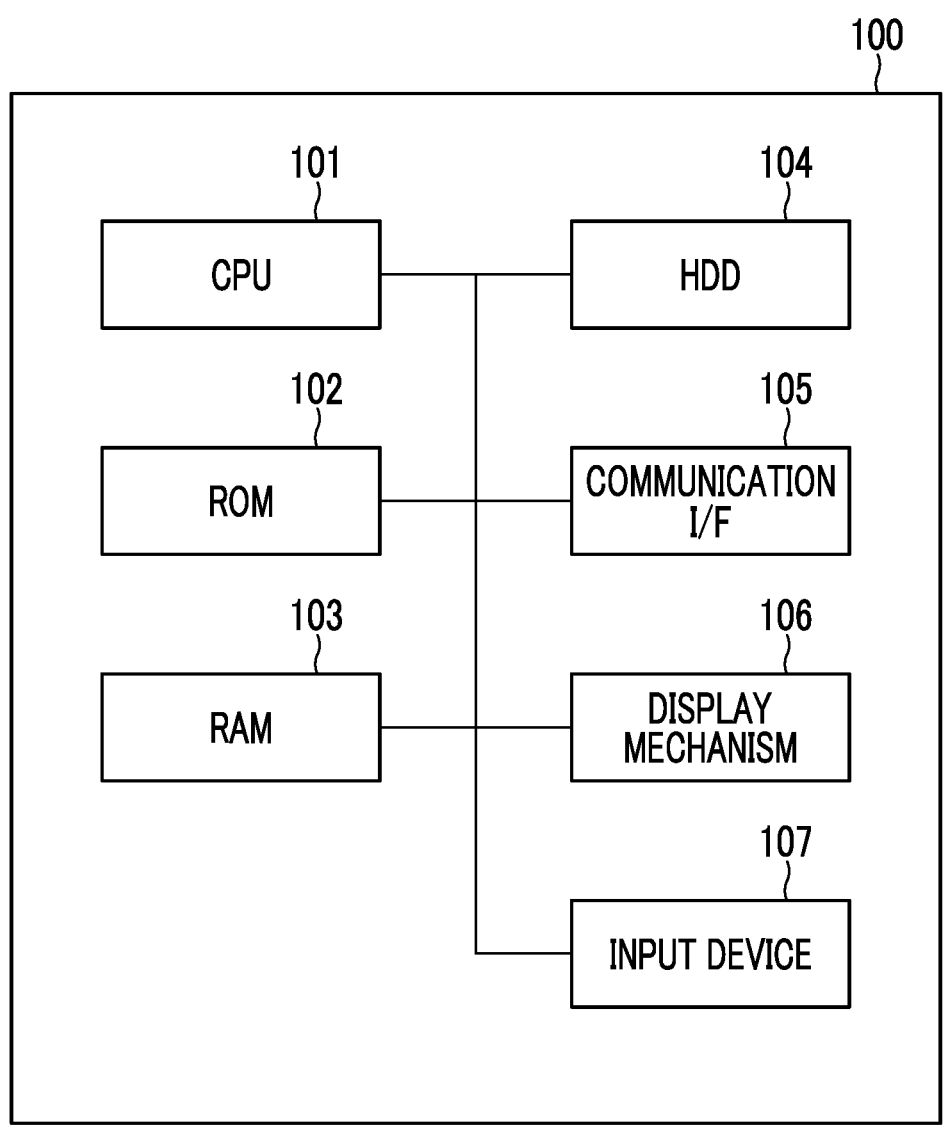
FIG. 2 is a diagram showing a hardware configuration example of a process management apparatus according to the present exemplary embodiment.

FIG. 2 is a diagram showing a hardware configuration example of the process management apparatus 100 according to the present exemplary embodiment.

As shown in FIG. 2, the process management apparatus 100 according to the present exemplary embodiment includes a central processing unit (CPU) 101, which is a calculation unit, a read only memory (ROM) 102, which is a storage region in which a program, such as a basic input output system (BIOS), is stored, and a random access memory (RAM) 103, which is an execution region of the program. Further, the process management apparatus 100 includes a hard disk drive (HDD) 104 which is a storage region in which various programs, such as an operating system (OS) or an application, input data with respect to various programs, output data from various programs, and the like are stored. Further, the process management apparatus 100 includes a communication interface (communication I/F) 105 that performs communication with an outside, a display mechanism 106, such as a display, and an input device 107, such as a keyboard, a mouse, or a touch panel.

Functional Configuration of Process Management Apparatus

Figure 3:
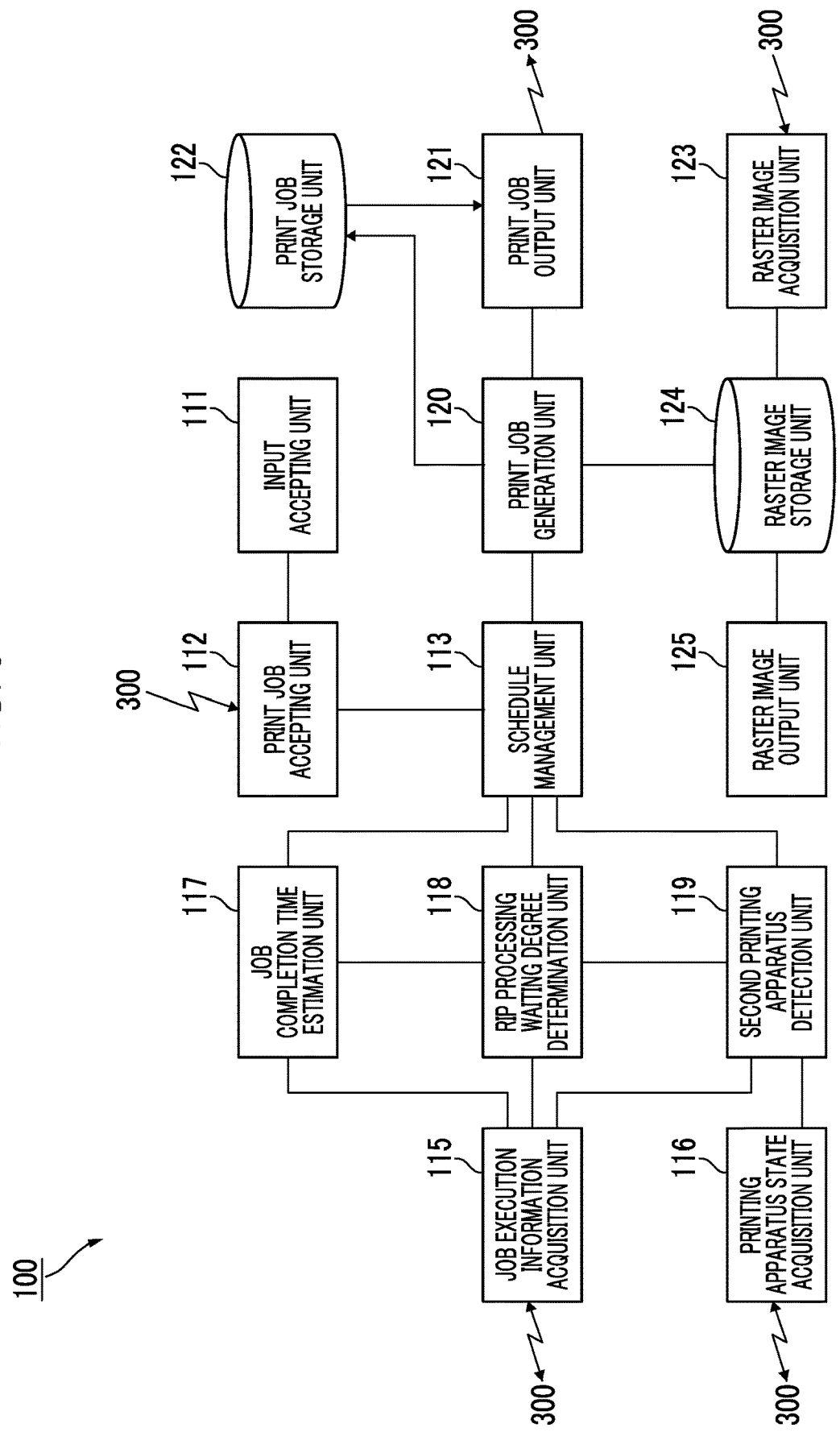
FIG. 3 is a diagram showing a functional configuration example of the process management apparatus according to the present exemplary embodiment.

Next, a functional configuration of the process management apparatus 100 will be described. FIG. 3 is a diagram showing the functional configuration of the process management apparatus 100 according to the present exemplary embodiment.

The process management apparatus 100 includes an input accepting unit 111 that accepts the print job input by a user to the process management apparatus 100 via the input device 107, and a print job accepting unit 112 that accepts the print job accepted by the input accepting unit 111 or the print job transmitted from the external printing apparatus 300 and the like. In addition, the process management apparatus 100 includes a schedule management unit 113 that manages a schedule of the accepted print job.

In addition, the process management apparatus 100 includes a job execution information acquisition unit 115 that acquires, from the printing apparatus 300, execution information on the print job registered in the printing apparatus 300, and a printing apparatus state acquisition unit 116 that acquires a state of the printing apparatus 300. In addition, the process management apparatus 100 includes a job completion time estimation unit 117 that estimates completion time of the job by using the acquired job execution information, an RIP processing waiting degree determination unit 118 that determines whether or not the number of the jobs waiting for the RIP processing in the printing apparatus 300 exceeds a threshold value, by using the acquired job execution information, and a second printing apparatus detection unit 119 that detects the printing apparatus 300 that can execute the RIP processing, by using the acquired job execution information and information on the printing apparatus. Further, the process management apparatus 100 includes a print job generation unit 120 that generates the print job, a print job storage unit 122 that stores the generated print job, and a print job output unit 121 that outputs the print job. Furthermore, the process management apparatus 100 includes a raster image acquisition unit 123 that acquires the raster image from the printing apparatus 300, a raster image storage unit 124 that stores the acquired raster image, and a raster image output unit 125 that transmits the stored raster image to the printing apparatus 300.

The print job accepting unit 112 accepts the print job from the input device 107 of the process management apparatus 100 or the external printing apparatus 300. As the print job accepted here, the printing apparatus 300 that executes the print job may not be determined, or the printing apparatus 300 that executes the print job may be determined.

The schedule management unit 113 decides the first printing apparatus 300a that executes the print job from among the printing apparatuses 300.

In a case in which the first printing apparatus 300a that executes the print job accepted by the print job accepting unit 112 is not determined, the schedule management unit 113 decides the first printing apparatus 300a that executes the print job accepted by the schedule management unit 113 in accordance with a predetermined condition. The predetermined condition is, for example, a function required for the accepted job, a processing capacity of the printing apparatus, the presence or absence of the postprocessing process. Further, the user may determine by which printing apparatus 300 the print job is executed.

The job execution information acquisition unit 115 transmits a job inquiry to each printing apparatus 300 shown in FIG. 1 and acquires job execution information on the print job registered in the printing apparatus 300. The job inquiry made here is made to the first printing apparatus 300a described above and the other printing apparatuses 300b to 300d having a possibility that the RIP processing is to be consigned. Here, the "print job registered as the job" is a job which should be processed by the printing apparatus 300. Further, the "job execution information" is information indicating which processing is executed or which processing is being executed for the registered print job. The job execution information indicates that, for example, the job is in a state of "hold after print job registration", "waiting for the RIP processing", "during the RIP processing", "hold after the RIP processing", "waiting for the print", "during the print", or "print completion".

Here, the state of "hold after the print job registration" is a state in which after the job is registered in the printing apparatus 300, and the job is not executed until an execution instruction is accepted from the user again. The "waiting for the RIP processing" is a state of waiting for the RIP processing to be executed. Here, the printing apparatus 300 executes raster processing in order based on the priority of the print jobs for which the execution instruction for the RIP processing is accepted. The print jobs for which the execution instruction for the RIP processing is accepted and which are waiting for the RIP processing in order are the print job in the state of "waiting for the RIP processing". The state of "during the RIP processing" is a state in which the processing of converting to the raster image is actually being executed. The "waiting for the print" is a state in which the job converted into the raster image receives the execution instruction for the print. The "hold after the RIP processing" is a state in which after the RIP processing is completed, execution is not performed until the execution instruction is accepted from the user again. The "waiting for the print" occurs in a case in which an image formation unit 320 (see FIG. 4) that actually performs image formation performs image formation of another print job or a case in which paper exchange of the image formation unit 320 is performed. The "during the print" is a state in which the image formation is actually performed by the image formation unit 320. The "print completion" is a state in which the printed recording medium is output and the print job is completed.

The printing apparatus state acquisition unit 116 acquires information indicating the state of the printing apparatus 300. Here, the information indicating the state of the printing apparatus 300 includes, for example, information indicating that the printing apparatus 300 is during the paper exchange, information indicating that the printing apparatus 300 fails, or information indicating that the printing apparatus 300 is in an idle state. Here, the idle state is a state in which the printing apparatus 300 does not execute print-related processing, but can be used immediately. The information indicating the state of the printing apparatus 300 is an example of the execution information.

The job completion time estimation unit 117 estimates whether or not the print job to be newly registered in the first printing apparatus 300a is completed by completion desired time.

The job completion time estimation unit 117 estimates, for the print job to be newly registered in the first printing apparatus 300a, the time when the print job is completed in a case in which the print job is registered in the first printing apparatus 300a. The time when the print job is completed is estimated by using the job execution information acquired by the job execution information acquisition unit 115, the print speed of the first printing apparatus 300a, or the like. Then, by comparing the estimated completion prediction time with the completion desired time, the estimation is made as to whether or not the print job to be newly registered in the first printing apparatus 300a is completed by the completion desired time.

Further, the job completion time estimation unit 117 also estimates the completion prediction time of the print job, for the print job registered in the printing apparatus 300.

The RIP processing waiting degree determination unit 118 acquires how much the RIP processing waiting time occurs for the first printing apparatus 300a that registers the job, and determines whether or not the RIP processing waiting time is longer than time predetermined as the waiting time.

The number of print jobs waiting for the RIP processing is an example of the "degree of time required for the processing" of converting the print data into the raster image. The "degree of time required for the processing" also includes the total number of print pages of print jobs waiting for the RIP processing. The "degree of time required for the processing" is grasped from the acquired job execution information. Note that for grasping the "degree of time required for the processing", in addition, a method may be adopted in which the time required for the past RIP processing and the number of pages on which the RIP processing is performed are stored, the average RIP processing time is calculated, and the number of pages waiting for the RIP processing is multiplied by the average RIP processing time to calculate the RIP processing waiting time.

The second printing apparatus detection unit 119 detects the second printing apparatus 300b that can execute the RIP processing based on a degree of capability to immediately execute the processing of converting. Here, the "degree of capability to immediately execute the processing of converting" is a degree indicating whether or not the accepted RIP processing can be executed immediately in a case in which the print job of the RIP processing is accepted. As the "degree of capability to immediately execute the processing of converting", for example, an amount of the print jobs which should be processed by the printing apparatus 300 or the state of the printing apparatus 300 can be used.

The second printing apparatus detection unit 119 acquires the job execution information of the other printing apparatuses 300b to 300d that are candidates for which the RIP processing is consigned and executed, from the job execution information acquisition unit 115, and detects the printing apparatus 300 that does not have the jobs waiting for the RIP processing and during the RIP processing in the job execution information, as the second printing apparatus 300b. In the present exemplary embodiment, the printing apparatus 300 that does not have the jobs waiting for the RIP processing and during the RIP processing is detected, but the printing apparatus 300 in which the number of the print jobs waiting for the RIP processing is equal to or less than the predetermined threshold value may be detected as the second printing apparatus 300b.

Further, as the "degree of capability to immediately execute the processing of converting", a data amount of the print data waiting for the RIP processing of the print jobs registered in the other printing apparatuses 300b to 300d may be used.

A determination can be made by acquiring the information indicating the state of the printing apparatus 300 from the printing apparatus state acquisition unit 116. For example, in a case in which the "idle state" is acquired as the information indicating the states of the other printing apparatuses 300b to 300d, the printing apparatus in the "idle state" may be detected as the second printing apparatus 300b.

Further, another condition may be adopted for the detection of the second printing apparatus 300b by the second printing apparatus detection unit 119. Here, as another condition, a condition based on a degree of an information processing capability of the printing apparatus 300 is an example. The "degree of the information processing capability" refers to, for example, a condition that the detected second printing apparatus 300b is the identical model as the first printing apparatus 300a or that the second printing apparatus 300b is a higher performance model than the first printing apparatus 300a. Further, examples of a high performance model include a model that can convert the print data into the raster image at a high speed.

The print job generation unit 120 generates the print job having various pieces of the control information other than the print data and the print data. More specifically, the print job generation unit 120 generates the print job for causing the second printing apparatus 300b detected by the second printing apparatus detection unit 119 to execute the RIP processing. The print job for causing the second printing apparatus 300b to execute the RIP processing includes the print data described in the page description language. In addition, the print job includes the control information in which transmission after the RIP processing is the output designation information (described below). In the print job, the raster image acquisition unit 123 of the process management apparatus 100 can also be designated as a transmission destination of the raster image after the RIP processing. Also, the first printing apparatus 300a can be designated as the transmission destination of the raster image after the RIP processing.

Here, the output designation information is the information indicating the stage in which the print job should be processed. In the present exemplary embodiment, the output designation information includes "hold after reception", "hold after the RIP processing", "transmission after the RIP processing", and "print". In a case in which the print job of the "hold after reception" is received, the printing apparatus 300 executes processing of registering the received print job and puts the print job in the hold state. Further, for the print job of the "hold after the RIP processing", the RIP processing is performed, and after the RIP processing, the print job is put in the hold state. For the print job of the "transmission after the RIP processing", the converted raster image is transmitted to the raster image acquisition unit 123 or the first printing apparatus 300a after the RIP processing. For the print job of the "print", the image formation is performed on the recording medium and the image is output.

Further, the print job generation unit 120 generates the print job that uses the print data as the raster image, by using the raster image stored in the raster image storage unit 124. The first printing apparatus 300a that accepts the print job does not need to convert the print data into the raster image.

The print job output unit 121 transmits the print job generated by the print job generation unit 120 to the first printing apparatus 300a and the second printing apparatus 300b.

Hardware Configuration of Printing Apparatus

Figure 4:
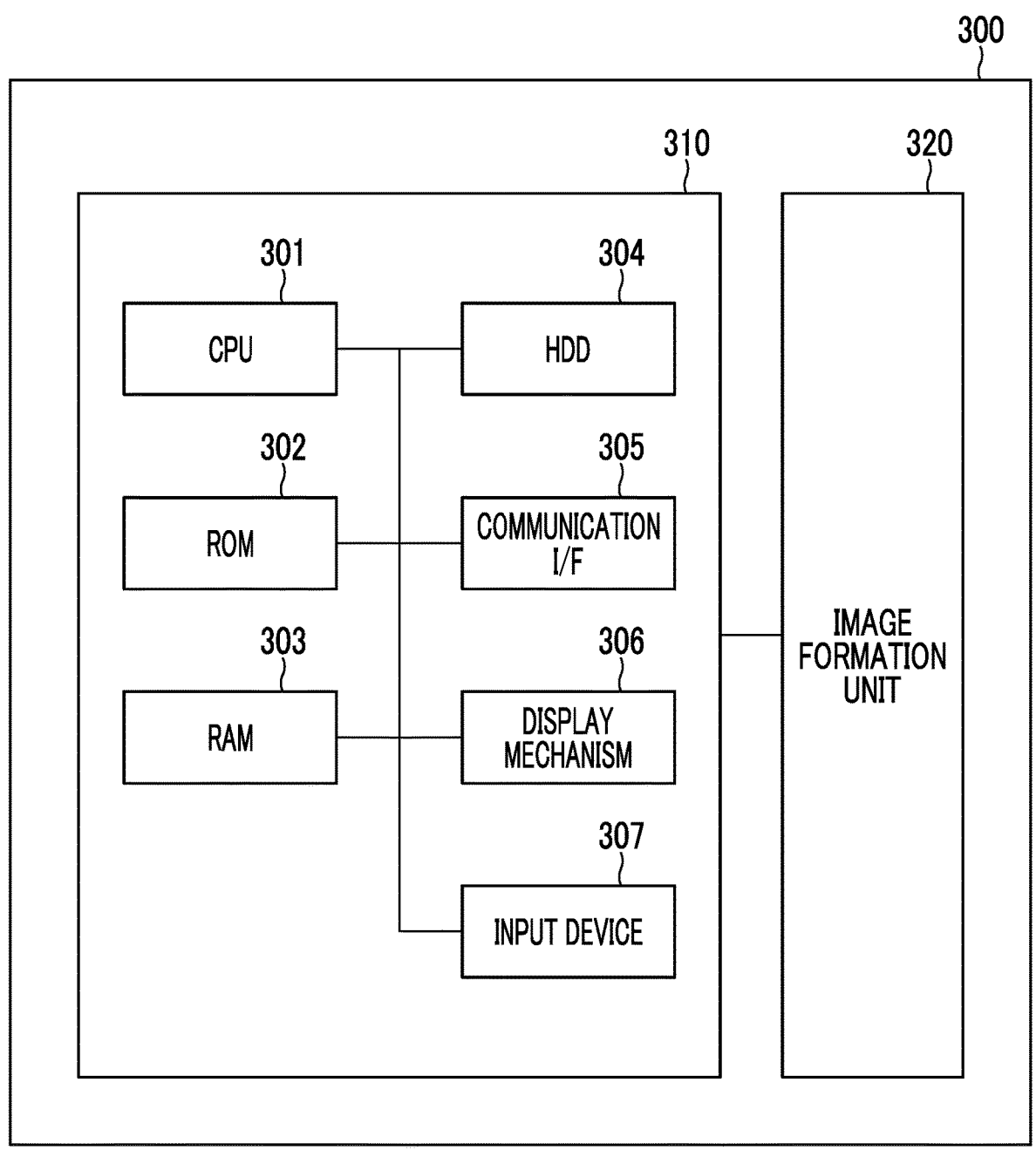
FIG. 4 is a diagram showing a hardware configuration example of a printing apparatus according to the present exemplary embodiment.

FIG. 4 is a diagram showing a hardware configuration example of the printing apparatus 300 according to the present exemplary embodiment.

The printing apparatus 300 includes a control unit 310 that controls the printing apparatus 300, and the image formation unit 320 that actually performs the print under the control of the control unit 310. The control unit 310, which is also called a digital front end (DEF), executes information processing, such as image processing required for the image formation unit 320 to perform the image formation. The hardware configuration of the control unit 310 includes the CPU 301 which is the calculation unit, the ROM 302 which is a storage region in which a program, such as the BIOS, is stored, and the RAM 303 which is the execution region of the program. Further, the printing apparatus 300 includes the HDD 304 which is the storage region in which various programs, such as the OS or the application, the input data with respect to various programs, the output data from various programs, and the like are stored. Further, the printing apparatus 300 includes a communication interface (communication I/F) 305 that performs communication with the outside, a display mechanism 306, such as a display, and an input device 307, such as a physical button or a touch panel.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Functional Configuration of Printing Apparatus

Figure 5:
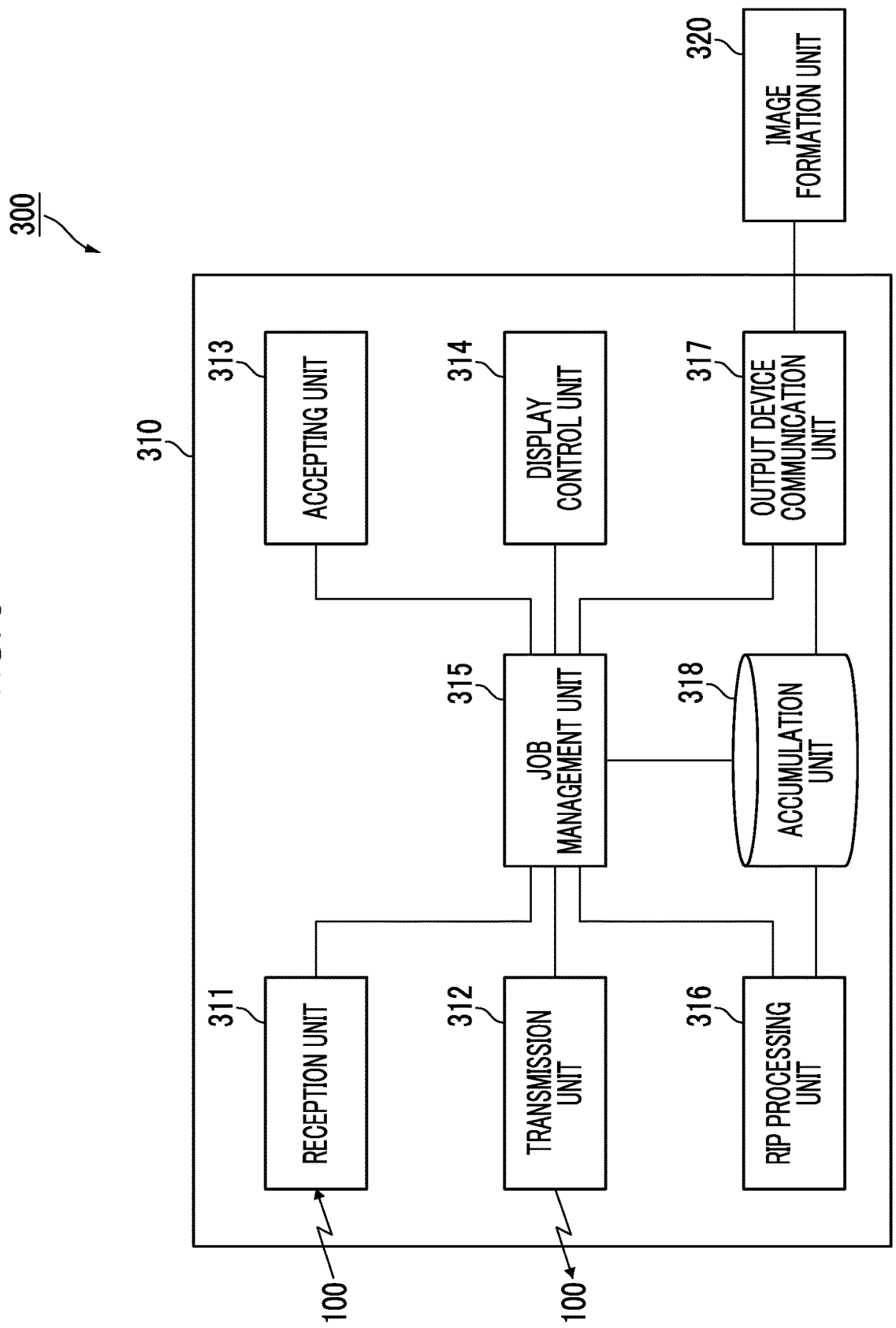
FIG. 5 is a diagram showing a functional configuration example of a control unit included in the printing apparatus according to the present exemplary embodiment.

Next, a functional configuration of the printing apparatus 300 will be described. FIG. 5 is a block diagram showing the functional configuration example of the printing apparatus 300.

The control unit 310 of the printing apparatus 300 includes a reception unit 311 that receives the information from the process management apparatus 100 and a transmission unit 312 that transmits the information to the process management apparatus 100. Further, the control unit 310 includes an accepting unit 313 that accepts the information input by the user to the printing apparatus 300 by using the input device 307, and a display control unit 314 that performs control of the display of the display mechanism 306. Further, the control unit 310 includes a job management unit 315 that manages the print job acquired from the accepting unit 313 or the reception unit 311 and an RIP processing unit 316 that converts the print data included in the print job into the raster image. Further, the control unit 310 includes an output device communication unit 317 that transmits the raster image and the information for controlling the image formation unit 320 to the image formation unit 320 and acquires the information indicating the state of the image formation unit 320, and an accumulation unit 318 that stores the print job.

In a case in which the job management unit 315 accepts the print job from the process management apparatus 100, the job management unit 315 stores the print job in the accumulation unit 318. Then, in accordance with the output designation information on the print job or the instruction from the user, the execution instruction for the processing is provided to the RIP processing unit 316 and the output device communication unit 317. Further, the job management unit 315 accepts event information acquired from the process management apparatus 100 via the reception unit 311 or various pieces of event information from the RIP processing unit 316 and the accepting unit 313, and executes the processing in accordance with the accepted event.

In a case in which the RIP processing unit 316 receives the execution instruction for the "RIP processing" from the job management unit 315, the RIP processing unit 316 executes the RIP processing on the print data in the accumulation unit 318.

In a case in which conversion to the raster image is completed, the RIP processing unit 316 stores the converted raster image in the accumulation unit 318, and notifies the job management unit 315 that the RIP processing is completed.

In a case in which the execution instruction for the print is accepted from the job management unit 315, the output device communication unit 317 performs communication with the image formation unit 320 and transmits the raster image and the output instruction to the image formation unit 320. Further, the output device communication unit 317 detects that the image formation unit 320 performs the image formation and completed the output, and notifies the job management unit 315 that the output is completed.

The accumulation unit 318 accumulates the print jobs accepted by the job management unit 315.

In addition, the accumulation unit 318 accumulates the raster images converted by the RIP processing unit 316. In a case in which the image formation unit 320 can accept the print data, the accumulated raster images are sequentially transmitted to the image formation unit 320 via the output device communication unit 317 under the management of the job management unit 315. Further, in a case in which the accumulation unit 318 functions as the second printing apparatus 300b and executes the RIP processing for the first printing apparatus 300a, the accumulated raster images are transmitted from the transmission unit 312 to the raster image acquisition unit 123 of the process management apparatus 100. Alternatively, the raster images are directly transmitted to the first printing apparatus 300a.

The display control unit 314 displays a job accepting screen or the job being executed. In a case in which the second printing apparatus 300b executes the RIP processing for the first printing apparatus 300a, a display screen of the second printing apparatus 300b displays that the RIP processing for the first printing apparatus 300a is being executed. However, depending on the settings by the user, this content may not be displayed. Further, in a case in which a processing cancel instruction is accepted by the accepting unit 313 in a case of executing the RIP processing for the first printing apparatus 300a, the display control unit 314 displays that the RIP processing is processing for the first printing apparatus 300a and, at the same time, displays a screen for confirming whether or not to cancel the RIP processing.

The accepting unit 313 accepts various instructions, such as the execution instruction or the cancel instruction for the processing from the user via the input device 307.

Operation of Process Management Apparatus

An operation of the process management apparatus 100 will be described with reference to FIGS. 6 and 7.

Figure 6:
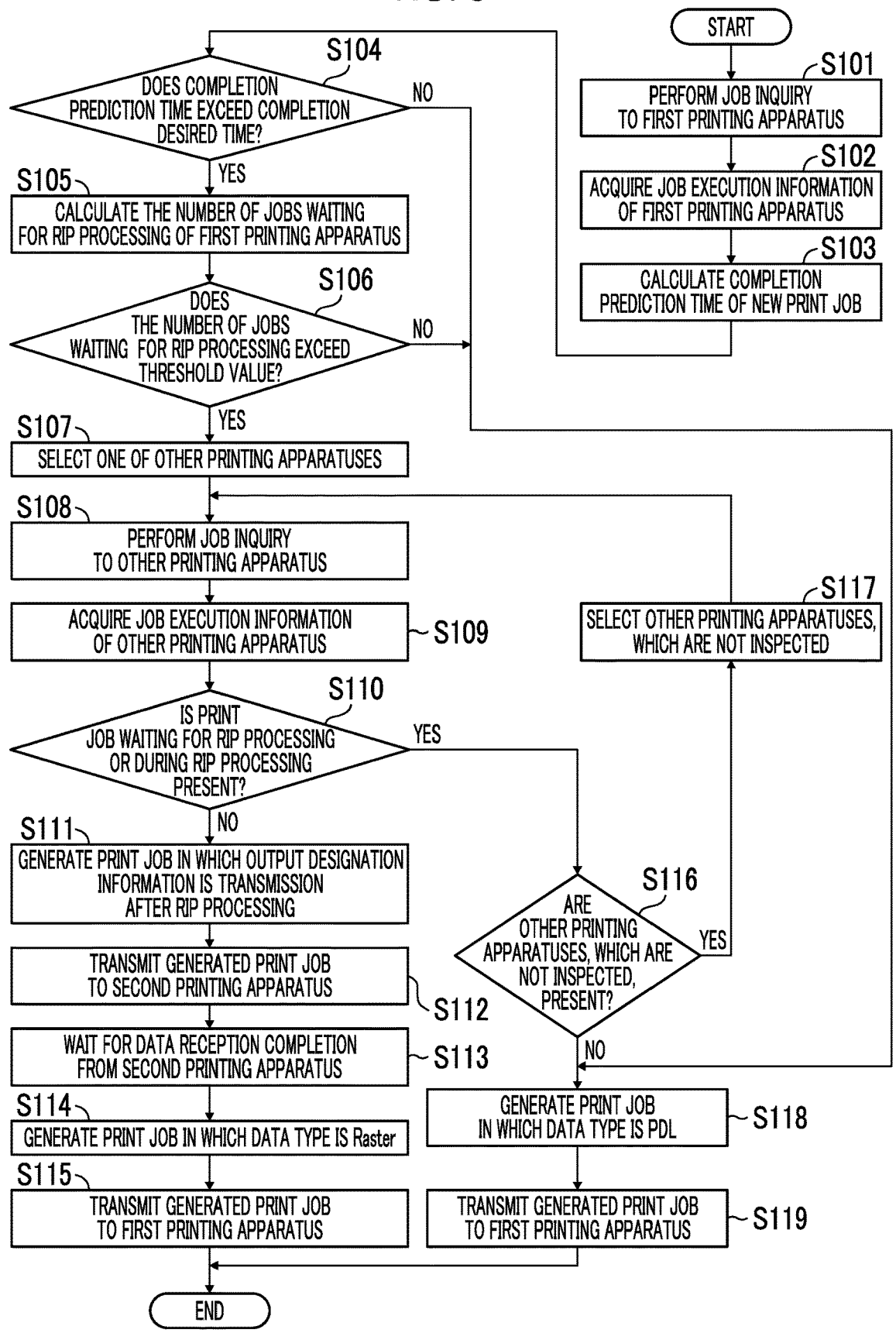
FIG. 6 is a flowchart showing an operation example of the process management apparatus according to the present exemplary embodiment.
Figure 7:
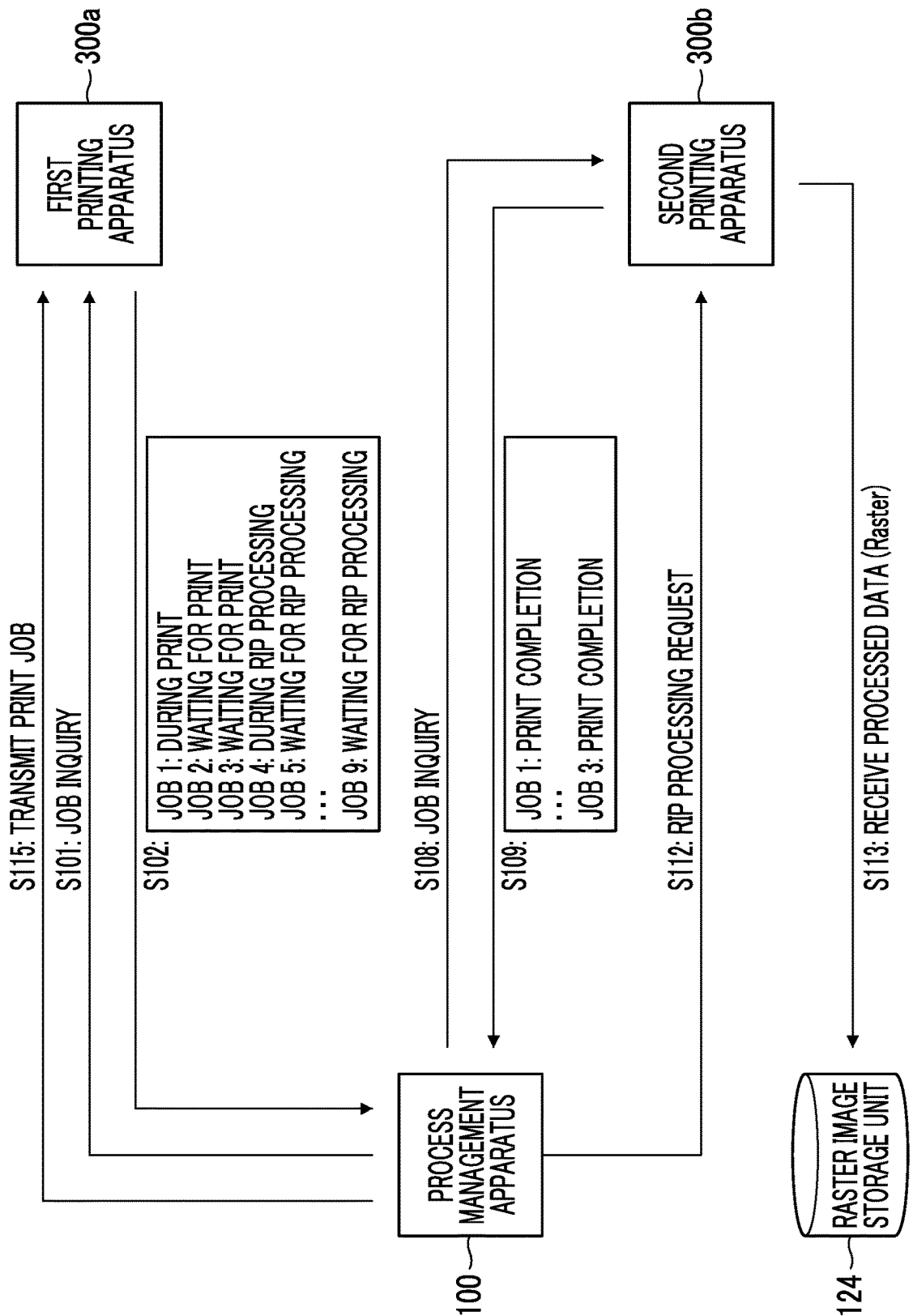
FIG. 7 is a diagram showing an operation example of the printing system according to the present exemplary embodiment.

FIG. 6 is a flowchart showing an operation example of the process management apparatus 100. Further, FIG. 7 is a specific example of the operation of the process management apparatus 100.

The process management apparatus 100 accepts a new print job, and first, the job execution information acquisition unit 115 performs the job inquiry to the first printing apparatus 300a that executes the new print job in order to acquire the job execution information on the current print job (step S101). Then, the job execution information acquisition unit 115 acquires the job execution information of the first printing apparatus 300a (step S102). In the specific example of FIG. 7, the job execution information on the job registered in the first printing apparatus 300a is the "during the print" for a job 1, the "waiting for the print" for jobs 2 and 3, the "during the RIP processing" for a job 4, and the "waiting for the RIP processing" for jobs 5 to 9. In step S102, these pieces of the job execution information are acquired.

Subsequently, the job completion time estimation unit 117 calculates the completion prediction time of the print job to be newly registered in the first printing apparatus 300a (step S103). The job completion time estimation unit 117 compares the calculated completion prediction time with the job completion desired time included in the new print job, and determines whether or not the calculated completion prediction time exceeds the completion desired time (step S104). Note that in a case of the print job in which the completion desired time is not present in the job execution information, the completion prediction time does not exceed the completion desired time.

In a case in which the calculated completion prediction time does not exceed the completion desired time in step S104 (NO in step S104), the first printing apparatus 300a executes all the processing, and the print job generation unit 120 generates the print job in which the data type of the print data is the page description language (PDL) and the output designation information is the "print" (step S118). Then, the print job output unit 121 transmits the generated print job to the first printing apparatus 300a (step S119), and the process ends.

In a case in which the completion prediction time exceeds the completion desired time in step S104 (YES in step S104), the RIP processing waiting degree determination unit 118 uses the job execution information on the print job already registered in the first printing apparatus 300a to calculate the number of the print jobs in the state of waiting for the RIP processing of the first printing apparatus 300a (step S105). In the specific example of FIG. 7, the job execution states of the jobs 5 to 9 are the "waiting for the RIP processing", and thus the number of the print jobs "waiting for the RIP processing" is calculated to be five.

The RIP processing waiting degree determination unit 118 determines whether or not the calculated number of the print jobs "waiting for the RIP processing" exceeds the predetermined threshold value (step S106). Here, the "predetermined threshold value" is a value set by the user, and is determined by the number of the jobs waiting for the processing or the total number of pages waiting for the processing. In a case in which the number of the print jobs "waiting for the RIP processing" does not exceed the predetermined threshold value (NO in step S106), the first printing apparatus 300a executes all the processing, and the print job generation unit 120 generates the print job in which the data type of the print data is the page description language (PDL) and the output designation information is the "print" (step S118). Thereafter, the print job output unit 121 transmits the generated print job to the first printing apparatus 300a (step S119), and the process ends.

In step S106, in a case in which the number of the print jobs "waiting for the RIP processing" exceeds the threshold value (YES in step S106), processing of detecting the second printing apparatus 300b that can execute the RIP processing is performed.

In the processing of detecting the second printing apparatus 300b, the second printing apparatus detection unit 119 first selects one of the other printing apparatuses 300b to 300d (step S107).

Next, the job execution information acquisition unit 115 performs the job inquiry to any of the other selected printing apparatuses 300b to 300d in order to acquire the job execution information on the current print job (step S108). Then, the job execution information acquisition unit 115 acquires the job execution information of the other printing apparatuses 300b to 300d to which the inquiry is performed (step S109). In the specific example of FIG. 7, in step S108, the job inquiry is performed to the second printing apparatus 300b, which is one of the other printing apparatuses 300b to 300d. Then, in step S109, the job execution information in which the jobs 1 to 3 are the "print completion" is acquired from the second printing apparatus 300b, which is one of the other printing apparatuses 300b to 300d.

Next, the second printing apparatus detection unit 119 determines whether or not the print job "during the RIP processing" and the print job "waiting for the RIP processing" are present in one of the other printing apparatuses 300b to 300d (step S110). In the specific example of FIG. 7, in the process management apparatus 100, the determination is made that the print job "during the RIP processing" and the print job "waiting for the RIP processing" are not present in the second printing apparatus 300b, which is one of the other printing apparatuses 300b to 300d.

In a case in which the job waiting for the RIP processing or during the RIP processing is not present (NO in step S110), the second printing apparatus detection unit 119 uses, as the second printing apparatus 300b, the apparatus in which the job waiting for the RIP processing or during the RIP processing is not present, and the print job generation unit 120 generates the print job for causing the second printing apparatus 300b to execute the RIP processing (step S111). The print job for causing the second printing apparatus 300b to execute the RIP processing is the print job in which the print data is the page description language (PDL) and the output designation information is the "transmission after the RIP processing".

The print job output unit 121 of the process management apparatus 100 transmits the generated print job to the second printing apparatus 300*b* (step S112). The process management apparatus 100 waits for completion of the reception of the raster image data, which is subjected to the RIP processing, from the second printing apparatus 300*b* (step S113). In a case in which the process management apparatus 100 receives the raster image from the second printing apparatus 300*b*, the print job generation unit 120 generates the print job in which the data type is Raster (raster image) (step S114). Then, the print job output unit 121 transmits the generated print job to the first printing apparatus 300*a* (step S115), and the process ends.

In a case in which the job during the RIP processing or waiting for the RIP processing is present in step S110 (YES in step S110), the determination is made as to whether or not the other printing apparatuses 300*b* to 300*d* are further present, which are not inspected and are the candidates for the apparatus that can execute the RIP processing (step S116). In a case in which there are the other printing apparatuses 300*b* to 300*d*, which are not inspected for whether or not the RIP processing can be executed in step S116 (YES in step S116), the other printing apparatuses 300*b* to 300*d*, which are not yet inspected, are selected (step S117). Then, in order to determine whether or not the RIP processing can be executed, the process returns to step S108 and the above process is performed.

In a case in which there are no other printing apparatuses 300*b* to 300*d*, which are not yet inspected, in step S116 (NO in step S116), the first printing apparatus 300*a* executes all the processing, and the print job generation unit 120 generates the print job in which the data type of the print data is the page description language (PDL) and the output designation information is the "print" (step S118). Thereafter, the print job output unit 121 transmits the generated print job to the first printing apparatus 300*a* (step S119), and the process ends.

Operation of Job Management Unit of Printing Apparatus

Next, an operation of the job management unit 315 of the printing apparatus 300 will be described with reference to FIGS. 8 and 9.

Figure 8:
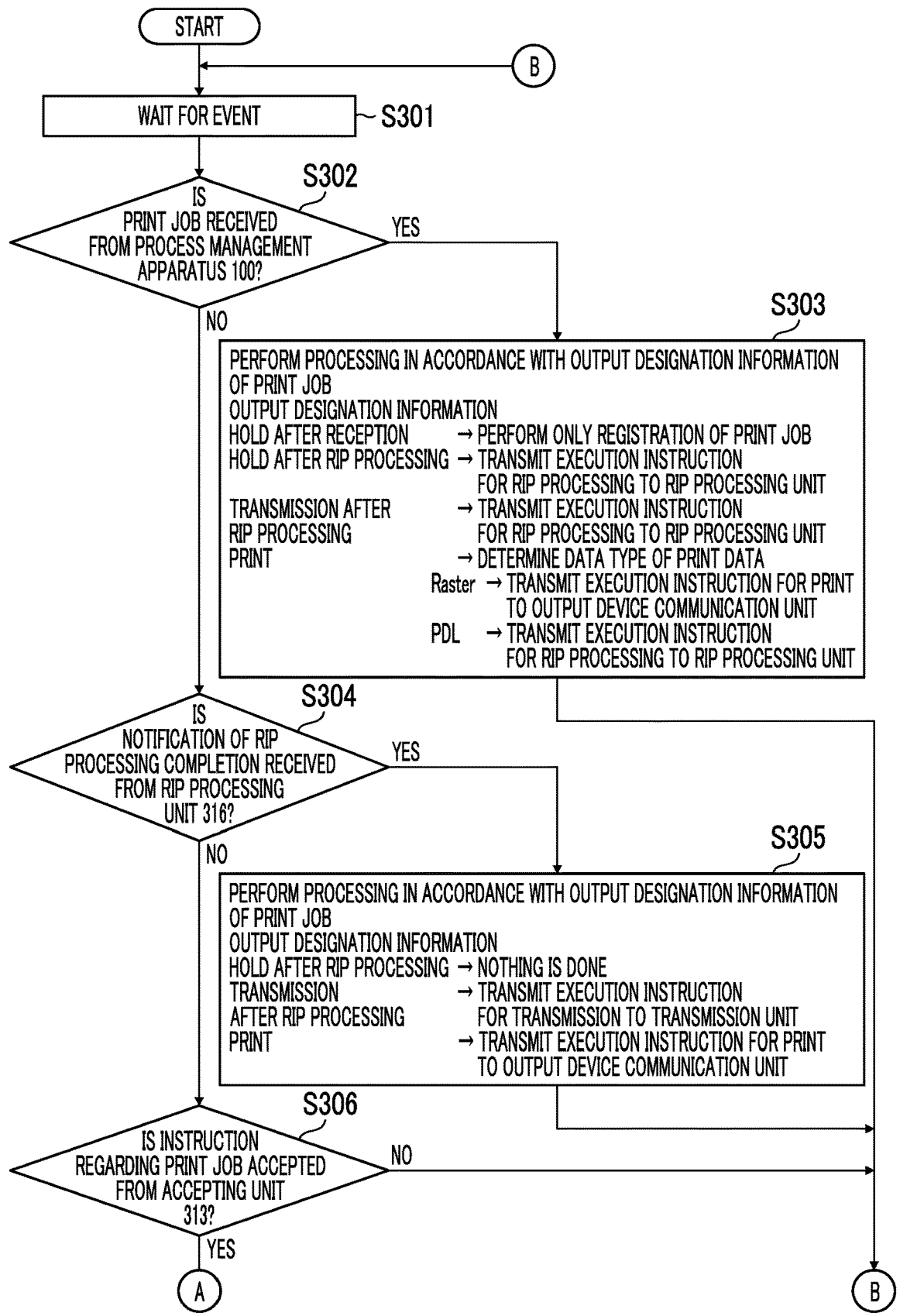
FIG. 8 is a flowchart showing an operation example of a job management unit included in the printing apparatus according to the present exemplary embodiment.
Figure 9:
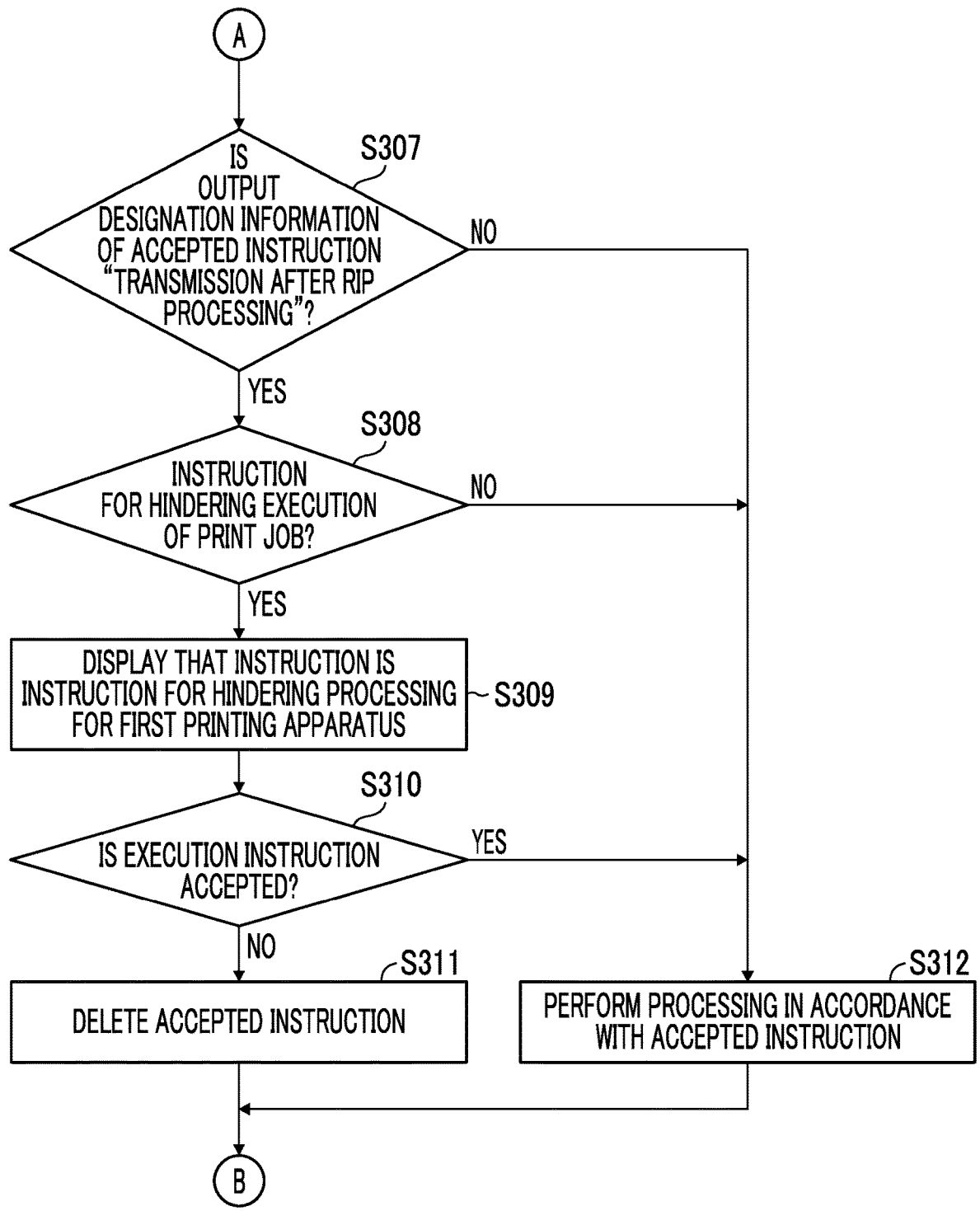
FIG. 9 is a flowchart showing an operation example of the job management unit included in the printing apparatus according to the present exemplary embodiment.

FIGS. 8 and 9 are flowcharts showing operation examples of the printing apparatus 300.

The job management unit 315 of the printing apparatus 300 is normally waiting for the event to occur from the process management apparatus 100, the RIP processing unit 316, the accepting unit 313, and the like (step S301). Note that the job management unit 315 may be configured to grasp the occurrence of the event at predetermined intervals without normally waiting for the event to occur.

In a case in which the occurrence of the event is confirmed, the job management unit 315 first determines whether or not the print job is received from the process management apparatus 100 (step S302). In a case in which the print job is accepted from the process management apparatus 100 (YES in step S302), the job management unit 315 confirms the output designation information included in the print job and executes the processing in accordance with the output designation information (step S303). As an example of the processing in accordance with the output designation information, in a case in which the output designation information is the "hold after reception", only the received print job is registered. In the case of the "hold after the RIP processing", the execution instruction for the RIP processing is transmitted to the RIP processing unit 316. In the case of the "transmission after the RIP processing", the execution instruction for the RIP processing is transmitted to the RIP processing unit 316. In the case of the "print", the data type of the print data is determined, and in a case in which the data type is Raster, the execution instruction for the print is transmitted to the output device communication unit 317. In a case in which the data type of the print data is PDL, the execution instruction for the RIP processing is transmitted to the RIP processing unit 316. In a case in which the processing (step S303) in accordance with the output designation information is completed, the process returns to step S301, and the occurrence of the event is awaited.

In a case in which the determination is made that the event does not accept the print job from the process management apparatus 100 in step S302 (NO in step S302), the determination is made as to whether or not the acquired event receives the notification that the RIP processing is completed (step S304). In a case in which the acquired event is the notification that the RIP processing is completed, which is transmitted from the RIP processing unit 316 (YES in step S304), the output designation information included in the print job for which the RIP processing is completed is confirmed, and the processing in accordance with the output designation information is performed (step S305). As an example of the processing in accordance with the output designation information, in a case in which the output designation information is the "hold after the RIP processing", nothing is done. In a case in which the output designation information is the "transmission after the RIP processing", the job management unit 315 transmits, to the transmission unit 312, the instruction for transmitting the raster image to a predetermined transmission destination. In a case in which the output designation information is the "print", the job management unit 315 transmits the execution instruction for the print to the output device communication unit 317. In a case in which the processing in accordance with the output designation information in step S305 is completed, the process returns to step S301, and the occurrence of the event is awaited.

In a case in which the determination is made that the acquired event does not receive the notification that the RIP processing is completed in step S304 (NO in step S304), the determination is made as to whether or not the acquired event is an instruction regarding the print job accepted from the accepting unit 313 (step S306). Examples of the instruction regarding the print job accepted from the accepting unit 313 include "deletion instruction", "cancel instruction", "finish instruction", and "restart instruction" of the print job. Here, the "cancel instruction" is processing of temporarily canceling the processing of the print job, and is an instruction for allowing a state in which the job processing can be restarted in a case in which the instruction is provided from the user again. Further, the "finish instruction" is an instruction for finishing the processing currently being executed by the printing apparatus 300. The "restart instruction" is an instruction for restarting the processing of the print job in the hold state or the cancel state.

In a case in which the determination is made that the accepted event is not the instruction regarding the print job in step S306 (NO in step S306), the process returns to step S301 without executing the processing, and the occurrence of the event is awaited.

In a case in which the determination is made that the accepted event is the instruction regarding the print job from the accepting unit 313 in step S306 (YES in step S306), the determination is made as to whether or not the output designation information included in the print job regarding the accepted instruction is the "transmission after the RIP processing" (step S307). In a case in which the determination is made that the output designation information is not the "transmission after the RIP processing" (NO in step S307), processing in accordance with the accepted instruction is executed (step S312), the process returns to step S301, and the occurrence of the event is awaited. Here, as a specific example of the processing in step S312, in a case in which the accepting unit 313 accepts the "cancel instruction", the job management unit 315 cancels the processing, such as the RIP processing, and restart is awaited. In addition, in a case in which the "finish instruction" is accepted, the processing is finished. In addition, in a case in which the "deletion instruction" is accepted, the information on the accepted print job is deleted. In a case in which the "restart instruction" is accepted, the processing of the canceled print job is restarted.

In a case in which the determination is made that the output designation information included in the print job is the "transmission after the RIP processing" in step S307 (YES in step S307), the determination is made as to whether or not the accepted instruction is an instruction for hindering the execution of the print job (step S308). Here, the "instruction for hindering the execution of the print job" is an instruction for hindering the RIP processing executed by the second printing apparatus 300b consigned by the first printing apparatus 300a, and examples thereof include the "deletion instruction", the "cancel instruction", and the "finish instruction" of the print job. Further, the instruction for not hindering the RIP processing is, for example, the "restart instruction".

In a case in which the determination is made that the accepted instruction is the instruction for not hindering the execution of the print job in step S308 (NO in step S308), the processing in accordance with the accepted instruction is executed (step S312), the process returns to step S301, and the occurrence of the event is awaited.

In a case in which the determination is made that the accepted instruction is the instruction for hindering the RIP processing in step S308 (YES in step S308), the job management unit 315 uses the display control unit 314 to display that the accepted instruction is the instruction for hindering the processing for the first printing apparatus 300a, further, the job management unit 315 uses the display control unit 314 to display a screen for selecting whether or not to execute the accepted instruction (step S309).

Then, the job management unit 315 determines whether or not the selection of whether or not to execute the instruction is accepted (step S310). In a case in which the selection to execute the instruction is accepted (YES in step S310), the processing in accordance with the accepted instruction is executed (step S312), the process returns to step S301, and the occurrence of the event is awaited.

In a case in which the selection not to execute the instruction is accepted in step S310 (NO in step S310), the accepted instruction is deleted without being executed (step S311). Then, the process returns to step S301, and the occurrence of the event is awaited.

Further, the configuration is adopted in which the user selects whether or not to execute the instruction for hindering the processing for the first printing apparatus 300a in step S309, but a configuration can be adopted in which the instruction for hindering the processing for the first printing apparatus 300a is not executed.

Note that in the present exemplary embodiment, a configuration is adopted in which, in a case of registering the new print job in the first printing apparatus 300a, the RIP processing is consigned to the second printing apparatus 300b and executed, but a configuration can be adopted in which for the print job which is already registered in the first printing apparatus 300a, the RIP processing is consigned to the second printing apparatus 300b and executed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus that manages print processes of a plurality of printing apparatuses, the information processing apparatus comprising:
   a processor configured to:
   acquire job execution information indicating current job in a queue and an execution status of each printing apparatus from the plurality of printing apparatuses;
   in a case in which a predetermined condition regarding processing of converting print data into a raster image is satisfied in one printing apparatus, extract another printing apparatus capable of executing the processing of converting the print data into the raster image from among other printing apparatuses other than the one printing apparatus by using the execution information;
   cause the other printing apparatus, that is extracted, to execute the processing of converting the print data of a print job scheduled to be printed in the one printing apparatus into the raster image; and
   perform control to transmit the raster image created by the other printing apparatus to the one printing apparatus.

2. The information processing apparatus according to claim 1,
   wherein the predetermined condition is a condition determined based on a degree of time required for the processing of converting the print data into the raster image.

3. The information processing apparatus according to claim 2,
   wherein the degree of time required for the processing of converting the print data into the raster image is the number of print jobs in which the print data is not converted into the raster image in the acquired execution information.

4. The information processing apparatus according to claim 2,
   wherein the degree of time required for the processing of converting the print data into the raster image is a total number of print pages of print jobs in which the print data is not converted into the raster image in the acquired execution information.

5. The information processing apparatus according to claim 1, wherein the processor is configured to:
   extract, as the other printing apparatus capable of executing the processing of converting the print data into the raster image, the other printing apparatus based on a degree of capability to immediately execute the processing of converting.

6. The information processing apparatus according to claim 5,
   wherein the degree of capability to immediately execute the processing of converting indicates a printing apparatus that has no print job in which the print data is not converted into the raster image in the execution information of the other printing apparatus.

7. The information processing apparatus according to claim 1,
wherein the other printing apparatus is extracted in accordance with a degree of an information processing capability of the other printing apparatus.

8. The information processing apparatus according to claim 7,
wherein, as the degree of the information processing capability, a determination is made as to whether or not the other printing apparatus to be extracted and the one printing apparatus are the identical model printing apparatus.

9. The information processing apparatus according to claim 7,
wherein, as the degree of the information processing capability, a determination is made as to whether or not the other printing apparatus to be extracted converts the print data into the raster image at a higher speed than the one printing apparatus.

10. The information processing apparatus according to claim 1, wherein the processor is configured to:
predict completion time that is time when the one printing apparatus completes each print job assigned to the one printing apparatus; and
in a case in which the predicted completion time does not exceed deadline time that is deadline time in a schedule predetermined for each print job, cause the other printing apparatus other than the one printing apparatus not to execute the processing of converting the print data of each print job assigned to the one printing apparatus into the raster image.

11. A printing apparatus comprising:
a processor configured to:
accept a job in which print data to be printed in one printing apparatus included in a plurality of printing apparatuses is converted into a raster image, from a process management apparatus that manages print processes of the plurality of printing apparatuses;
convert the print data included in the accepted job into the raster image; and
transmit the raster image to an outside without performing self-print of the converted raster image.

12. The printing apparatus according to claim 11, further comprising:
a display unit that displays information regarding the printing apparatus,
wherein the processor is configured to:
in a case in which the accepted print data is converted into the raster image, display, on the display unit, information indicating a fact that the print data is data to be printed in the one printing apparatus.

13. The printing apparatus according to claim 12, further comprising:
an accepting unit that accepts cancel processing of canceling processing that is being executed,
wherein the processor is configured to:
in a case in which the print data is converted into the raster image and when the cancel processing is accepted, display, on the display unit, a fact that the accepted cancel processing is processing regarding the data to be printed in the one printing apparatus and information for confirming whether or not to execute the cancel processing.

14. An information processing system comprising:
a process management apparatus; and
a plurality of printing apparatuses,
wherein the process management apparatus
acquires job execution information indicating current job in a queue and an execution status of a print job to be executed by each printing apparatus from the plurality of printing apparatuses,
extracts, in a case in which a predetermined condition regarding processing of converting print data into a raster image is satisfied in one printing apparatus, another printing apparatus capable of executing the processing of converting the print data into the raster image from among other printing apparatuses other than the one printing apparatus by using the execution information,
causes the other printing apparatus, that is extracted, to execute the processing of converting the print data of a print job scheduled to be printed in the one printing apparatus into the raster image, and
performs control to transmit the raster image created by the other printing apparatus to the one printing apparatus, and
each of the plurality of printing apparatuses
accepts a print job in which the print data to be printed in the one printing apparatus is converted into the raster image, from the process management apparatus,
converts the print data included in the accepted print job into the raster image, and
transmits the converted raster image for printing by the one printing apparatus.

15. The information processing apparatus according to claim 1, further comprising: scheduling the print job for printing the print data for the one printing apparatus for processing print data prior to the extraction of the other printing apparatus.

* * * * *